United States Patent
Graber et al.

(10) Patent No.: US 10,462,852 B2
(45) Date of Patent: Oct. 29, 2019

(54) IR TEMPERATURE SENSOR FOR INDUCTION HEATING OF FOOD ITEMS

(71) Applicant: TurboChef Technologies, Inc., Carrollton, TX (US)

(72) Inventors: Warren S Graber, Hoffman Estates, IL (US); Reinhard Metz, Wheaton, IL (US); Robert J Visher, Downers Grove, IL (US)

(73) Assignee: TURBOCHEF TECHNOLOGIES, INC, Carrollton, TX (US)

( * ) Notice: Subject to any disclaimer, the term of this patent is extended or adjusted under 35 U.S.C. 154(b) by 317 days.

(21) Appl. No.: 15/390,208

(22) Filed: Dec. 23, 2016

(65) Prior Publication Data

US 2017/0142781 A1 May 18, 2017

Related U.S. Application Data

(63) Continuation of application No. 13/294,395, filed on Nov. 11, 2011, now Pat. No. 9,568,369.

(51) Int. Cl.
| | |
|---|---|
| H05B 6/06 | (2006.01) |
| G01J 5/00 | (2006.01) |
| G01J 5/04 | (2006.01) |
| G01J 5/08 | (2006.01) |
| G01J 5/02 | (2006.01) |
| H05B 6/12 | (2006.01) |

(52) U.S. Cl.
CPC ............ *H05B 6/062* (2013.01); *G01J 5/0003* (2013.01); *G01J 5/0275* (2013.01); *G01J 5/0285* (2013.01); *G01J 5/046* (2013.01); *G01J 5/0803* (2013.01); *H05B 6/1209* (2013.01)

(58) Field of Classification Search
CPC .......... G01J 5/20; G01J 5/0003; G01J 5/0803; G01J 5/046; G01J 5/0285; G01J 5/0275; H05B 6/062; H05B 6/12; H05B 6/1209; H05B 6/105
USPC ....... 219/620, 621, 622, 624, 626, 627, 635, 219/650, 665, 667
See application file for complete search history.

(56) References Cited

U.S. PATENT DOCUMENTS

| | | | | |
|---|---|---|---|---|
| 3,530,499 A | * | 9/1970 | Schroeder ............... | H05B 3/685 219/621 |
| 3,715,550 A | * | 2/1973 | Harnden, Jr. .......... | H05B 6/062 126/39 J |
| 3,719,789 A | * | 3/1973 | Harnden, Jr. ........... | F24C 3/126 219/627 |
| 3,742,174 A | * | 6/1973 | Harnden, Jr. .......... | A47J 27/002 219/445.1 |
| 3,742,178 A | * | 6/1973 | Harnden, Jr. .......... | A47J 27/002 219/385 |
| 3,742,179 A | * | 6/1973 | Harnden, Jr. .......... | H05B 6/062 219/501 |

(Continued)

*Primary Examiner* — Jimmy Chou
(74) *Attorney, Agent, or Firm* — Michael Best & Friedrich LLP

(57) ABSTRACT

A system and method for measuring the temperature of cookware to be induction-heated, using an infrared temperature sensor. An induction heater countertop may include a viewing window between the infrared temperature sensor and the cookware. Various algorithms may be applied to the sensed temperature, to adjust it to account for the presence of the viewing window, as well as variations in the cookware material.

20 Claims, 2 Drawing Sheets

(56) References Cited

U.S. PATENT DOCUMENTS

| | | | | |
|---|---|---|---|---|
| 3,777,094 A * | 12/1973 | Peters, Jr. | | A47J 36/04 206/457 |
| 3,781,504 A * | 12/1973 | Harnden, Jr. | | F24C 15/105 219/502 |
| 3,786,220 A * | 1/1974 | Harnden, Jr. | | F24C 15/105 219/445.1 |
| 4,110,588 A * | 8/1978 | Holz | | G05D 23/20 219/499 |
| 4,638,135 A * | 1/1987 | Aoki | | H05B 6/062 219/497 |
| 6,140,617 A * | 10/2000 | Berkcan | | H05B 3/746 219/446.1 |
| 6,169,486 B1 * | 1/2001 | Berkcan | | H05B 3/746 340/584 |
| 6,265,712 B1 * | 7/2001 | Charlier | | G01J 5/04 250/252.1 |
| 6,320,169 B1 * | 11/2001 | Clothier | | G06K 7/0008 219/620 |
| 6,369,386 B1 * | 4/2002 | Charlier | | G01J 5/04 250/252.1 |
| 6,403,932 B1 * | 6/2002 | Nelson | | H05B 3/746 219/448.11 |
| 6,417,496 B1 * | 7/2002 | Bates | | H05B 3/746 219/448.11 |
| 6,433,333 B1 * | 8/2002 | Howard | | H04N 5/33 250/252.1 |
| 6,555,793 B2 * | 4/2003 | Griffiths | | H05B 3/746 219/446.1 |
| 6,861,628 B2 * | 3/2005 | Owens | | A47J 36/2483 219/387 |
| 6,953,919 B2 * | 10/2005 | Clothier | | H05B 6/062 219/494 |
| 7,102,109 B2 * | 9/2006 | Niiyama | | H05B 6/062 219/494 |
| 7,119,337 B1 * | 10/2006 | Johnson | | G01J 3/02 250/339.13 |
| 7,129,449 B2 * | 10/2006 | Tominaga | | H05B 6/062 219/627 |
| 7,402,781 B2 * | 7/2008 | Kondo | | H05B 6/1218 219/620 |
| 7,550,725 B2 * | 6/2009 | Hollander | | G01J 5/0044 250/338.1 |
| 7,573,005 B2 * | 8/2009 | Clothier | | H05B 3/746 219/412 |
| RE42,513 E * | 7/2011 | Clothier | | H05B 6/062 219/494 |
| 8,212,192 B2 * | 7/2012 | Tominaga | | H05B 6/062 219/620 |
| 8,350,197 B2 * | 1/2013 | Tominaga | | H05B 6/062 219/625 |
| 8,357,882 B2 * | 1/2013 | Jones | | A47J 27/002 126/400 |
| 8,389,912 B2 * | 3/2013 | Niiyama | | H05B 6/062 219/502 |
| 8,450,665 B2 * | 5/2013 | Ogasawara | | H05B 6/062 219/620 |
| 8,734,935 B2 * | 5/2014 | Striegler | | C03C 17/3405 428/212 |
| 8,796,599 B2 * | 8/2014 | Sakakibara | | H05B 6/062 219/625 |
| 8,853,599 B2 * | 10/2014 | Kusaka | | H05B 6/062 219/623 |
| 9,568,369 B2 * | 2/2017 | Graber | | H05B 6/062 |
| 2001/0001047 A1 * | 5/2001 | Nelson | | C09J 7/22 428/349 |
| 2005/0242088 A1 * | 11/2005 | Takada | | H05B 6/062 219/635 |
| 2006/0049178 A1 * | 3/2006 | Tominaga | | H05B 6/062 219/627 |
| 2006/0081615 A1 * | 4/2006 | Kataoka | | H05B 6/062 219/622 |
| 2006/0091135 A1 * | 5/2006 | Kondo | | H05B 6/1218 219/621 |
| 2007/0278216 A1 * | 12/2007 | Tominaga | | H05B 6/062 219/627 |
| 2009/0014657 A1 * | 1/2009 | Cole | | G08B 13/19602 250/353 |
| 2009/0188909 A1 * | 7/2009 | Jones | | A47J 27/002 219/621 |
| 2010/0051608 A1 * | 3/2010 | Tominaga | | H05B 6/062 219/621 |
| 2010/0065550 A1 * | 3/2010 | Tominaga | | H05B 6/062 219/622 |
| 2010/0065551 A1 * | 3/2010 | Tominaga | | H05B 6/062 219/622 |
| 2010/0102054 A1 * | 4/2010 | Fujinami | | H05B 6/062 219/627 |
| 2010/0176120 A1 * | 7/2010 | Watanabe | | H05B 6/062 219/624 |
| 2010/0181299 A1 * | 7/2010 | Niiyama | | H05B 6/062 219/620 |
| 2010/0243641 A1 * | 9/2010 | Ogasawara | | H05B 6/062 219/622 |
| 2010/0314385 A1 * | 12/2010 | Fujita | | A47J 27/002 219/621 |
| 2011/0000904 A1 * | 1/2011 | Sakakibara | | H05B 6/062 219/624 |
| 2011/0073588 A1 * | 3/2011 | Kusaka | | H05B 6/062 219/621 |
| 2011/0198342 A1 * | 8/2011 | Fujinanni | | H05B 6/062 219/620 |
| 2011/0259877 A1 * | 10/2011 | Watanabe | | H05B 6/062 219/620 |
| 2011/0284524 A1 * | 11/2011 | Okuda | | H05B 6/062 219/622 |
| 2011/0315674 A1 * | 12/2011 | Fujinanni | | H05B 6/062 219/621 |
| 2011/0315675 A1 * | 12/2011 | Sakakibara | | H05B 6/062 219/622 |
| 2012/0000904 A1 * | 1/2012 | Hashimoto | | H05B 6/062 219/622 |
| 2012/0118874 A1 * | 5/2012 | Williams | | H05B 6/1209 219/620 |
| 2012/0199689 A1 * | 8/2012 | Burkland | | F42B 15/01 244/3.16 |
| 2015/0373787 A1 * | 12/2015 | Visher | | H05B 6/062 219/622 |

* cited by examiner

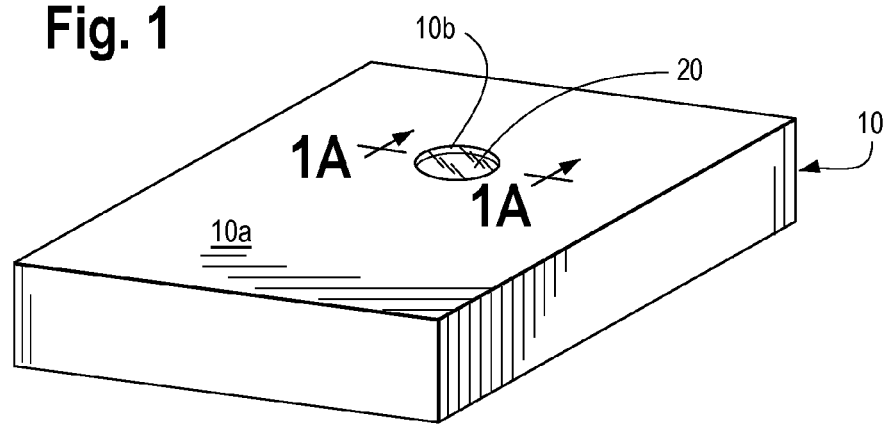
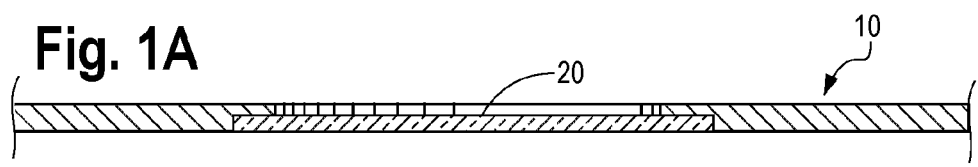
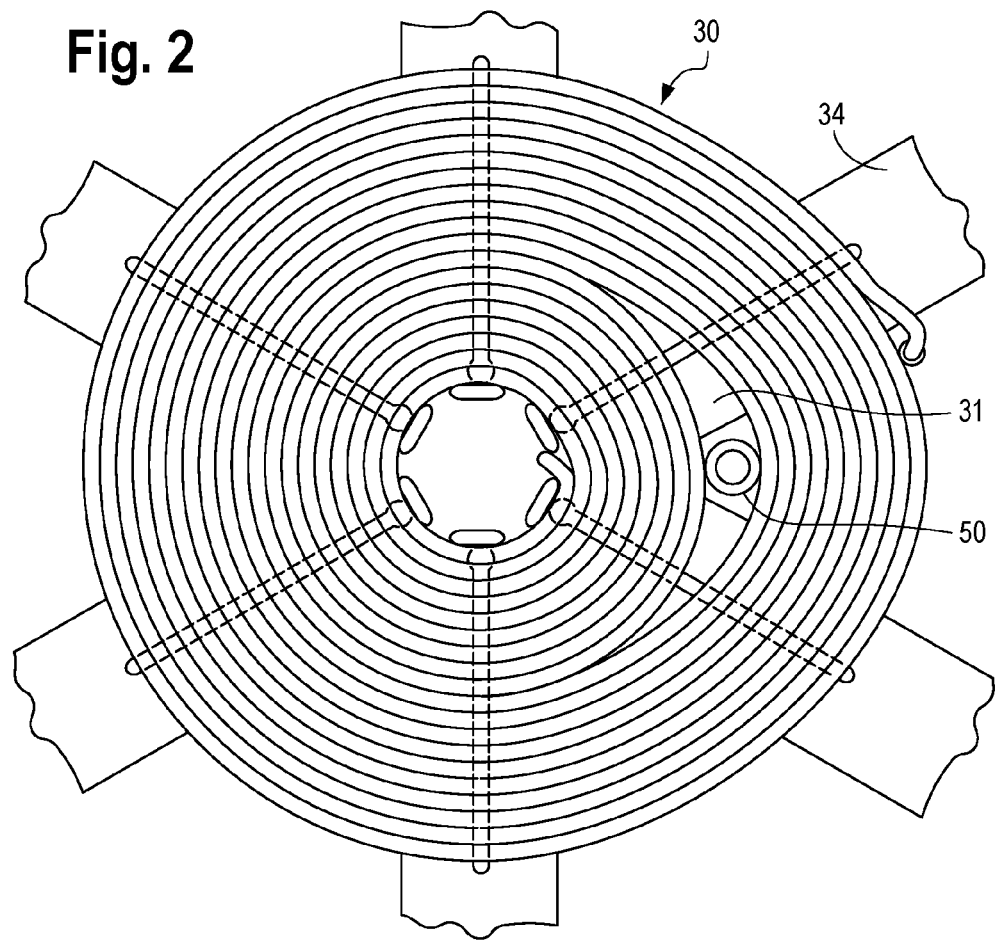

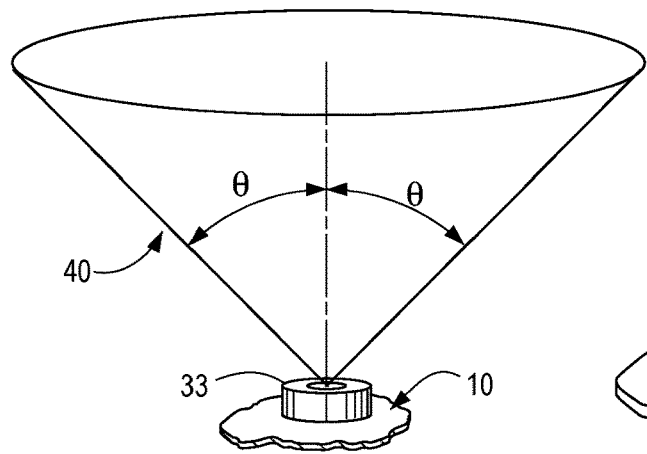
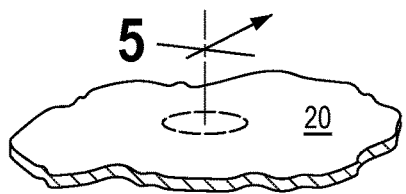
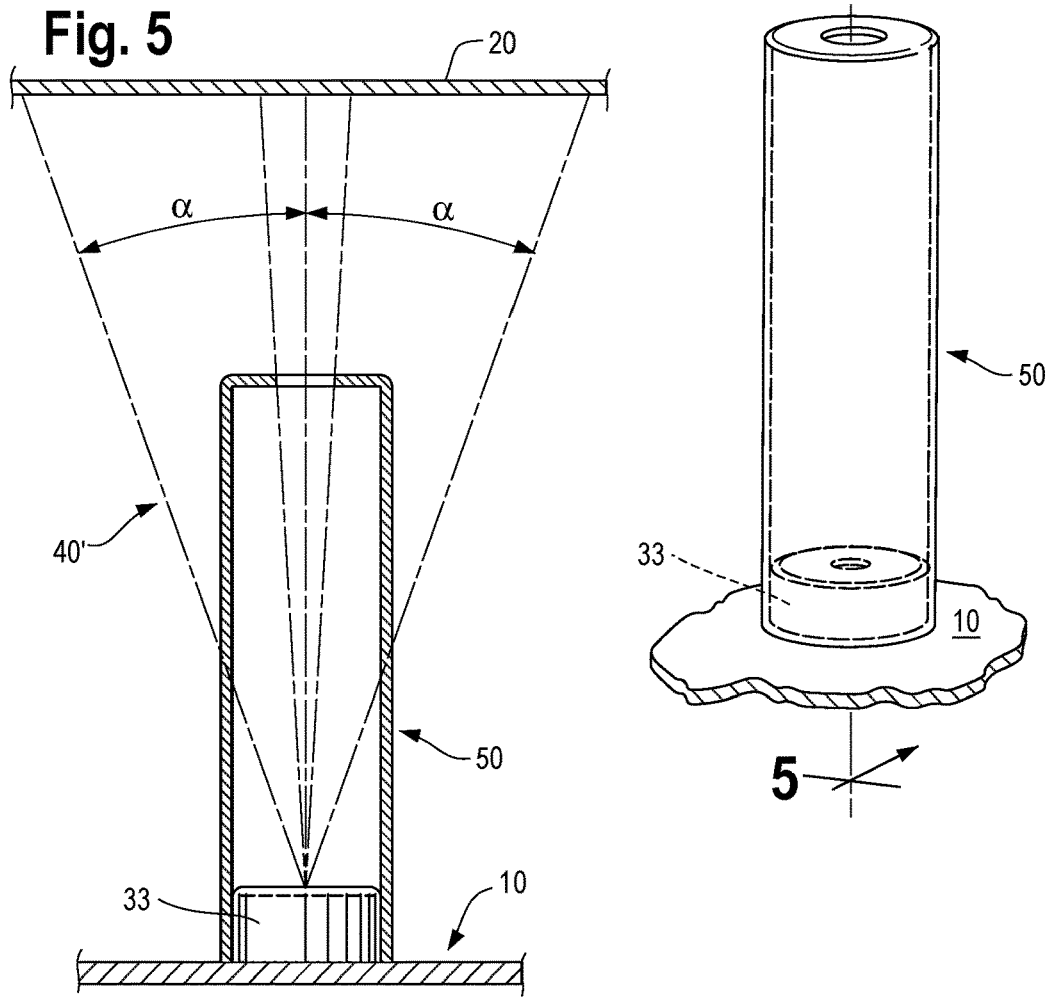

IR TEMPERATURE SENSOR FOR INDUCTION HEATING OF FOOD ITEMS

REQUEST FOR PRIORITY

This is a continuation of U.S. Ser. No. 13/294,395, titled "IR TEMPERATURE SENSOR FOR INDUCTION HEATING OF FOOD ITEMS," filed on Nov. 11, 2011. No new matter has been added.

BACKGROUND OF THE INVENTION

The present invention relates to temperature sensing of food items that are heated or warmed using induction-based food warming and holding units. More particularly, the invention relates to non-contact temperature measurement of such food items using infrared (IR) temperature sensing.

Direct contact temperature sensing of induction-heated food items is known using, for example, resistive thermal devices (RTDs). However, traditional temperature sensing technologies used with food and holding techniques are hindered by inaccuracy. These methods have slow response times, require expensive accessories and/or are subject to unrealistic requirements such as maintaining a perfectly flat bottom pan. Additionally, direct contact temperature sensing methods make accurate temperature readings difficult or impossible when dealing with induction-heated cookware having underside surface height variations, as with porcelain cookware.

Accordingly, while IR temperature sensing for induction-based food warming and holding units would have several advantages, including solving the deficiencies of direct contact temperature sensing methods, it also introduces several technical challenges that must be overcome in order to have a functional, real-world solution in the induction-based food warming/holding environment. For example, the IR sensor should be located in a position so that it can sense the warmest part of the object whose temperature is to be measured, and its radiated emissivity levels must be capable of being monitored in a way that accounts for environmental distortions, such as the presence of covers/shields, and the use of differing materials comprising the food warming/ holding units. Other technical hurdles, also mentioned below, had to be overcome as well.

Accordingly, it would be advantageous to provide an IR temperature sensing apparatus and method that would allow non-direct contact temperature sensing of induction-heated food objects located in food warming/holding units.

SUMMARY OF THE INVENTION

The objects mentioned above, as well as other objects, are solved by the present invention, which overcomes disadvantages of prior temperature sensors and methods of using them for induction heating devices for food warming/holding applications, while providing new advantages not believed associated with such known sensors and methods.

In one preferred embodiment, a system for measuring the temperature of cookware to be induction-heated is provided. A preferred system includes an induction heater having a countertop for supporting the cookware, and an infrared temperature sensor. The cookware may be porcelain or metallic, for example, and may be used to heat food (such as a pot), or only to hold warmed food (such as a serving tray or dish). The countertop preferably includes a viewing window between the infrared temperature sensor and the cookware. A temperature of the cookware may be sensed using the infrared temperature sensor, and an algorithm may be applied to adjust the sensed temperature to account for at least the presence of the viewing window. The viewing window is preferably made of a material, such as polyethylene plastic, having an acceptable spectral response such that the window does not substantially block radiant energy emanating from the cookware, and may allow, for example, a transmission of IR wavelengths from the cookware in the range of approximately 2-15 µm.

In an alternative embodiment, the glass countertop of the induction unit may include a hole corresponding to the dimensions of a port for the viewing window. The glass top may be backed or laminated with a plastic sheet. The plastic sheet may also have a hole, allowing for the insertion of an IR transparent window, such as polyethylene plastic, for example.

In one preferred embodiment, the induction heater includes an induction coil with a gap, and the infrared temperature sensor is located at the gap. In a particularly preferred embodiment, the gap in the induction coil is located at a radius of the power ring of the induction coil.

In another preferred embodiment, a system for measuring the temperature of cookware to be induction-heated is provided, that includes an induction heater for heating the cookware, and an infrared temperature sensor for measuring a temperature of the cookware. A device may be used, such as but not limited to a metal cylinder, for narrowing the conical field of view of the temperature sensed by the infrared temperature sensor. The temperature of the cookware is sensed using the infrared temperature sensor, and a first, field-of-view algorithm may then be applied to adjust the sensed temperature to account for the narrowed field of view. In a particularly preferred embodiment, the cylinder is aluminum, and its inner surface is black in color. The field-of-view algorithm which is applied may involve a ratio of the surface area of the narrowing field-of-view device and the surface area of the cookware which is visible to the infrared temperature sensor. The field-of-view algorithm may also involve a measured temperature of the narrowing field-of-view device raised to the fourth power to derive an average temperature of the cookware. In this embodiment, the induction heater may include a countertop for supporting the cookware, the countertop may include a viewing window located between the infrared temperature sensor and the cookware, and a second algorithm may be applied to adjust the sensed temperature to account for the presence of the viewing window.

In still another embodiment, a system for measuring the temperature of cookware to be induction-heated is provided, and includes an induction heater for heating the cookware, and an infrared temperature sensor for measuring a temperature of the cookware. A temperature of the food item may be sensed using the infrared temperature sensor, and one or more algorithms may be applied to adjust the sensed temperature to account for variations in a material of the cookware. The one or more algorithms may determine if a significant variation from near ideal emissivity is present, using a change in temperature of the cookware as measured by the infrared temperature sensor. A location on the cookware for temperature measuring may be picked to provide a maximum temperature of the cookware (such as at the bottom of a pan). A change in temperature for a given cookware item may be calculated, using a classification of nominal amounts of power drawn by the cookware, and one or more algorithms may be derived using a piecewise function empirically determined and applied to the corrected temperatures.

In still another preferred embodiment, a system is provided for measuring the temperature of porcelain cookware to be induction-heated. The system includes an induction heater for heating the cookware, and an infrared temperature sensor for measuring the temperature of the porcelain cookware. The porcelain cookware may include an inducible decal, which may include silver. The induction heater may include a countertop for supporting the porcelain cookware, and the countertop may include a plastic viewing window located between the infrared temperature sensor and the cookware. The field of view of the sensor may be narrowed using a narrowing device, and algorithms may be applied to adjust the sensed temperature to account for the narrowed field of view of the sensor, and to account for the presence of the viewing window.

A method for measuring the temperature of cookware to be induction-heated is also disclosed. In one preferred method, an infrared temperature sensor and an induction heater are provided. The induction heater may have a countertop for supporting the cookware, and the countertop may have a viewing window located between the infrared temperature sensor and the cookware. A temperature of the cookware may be sensed using the infrared temperature sensor. At least a first algorithm may be applied to this sensed temperature to adjust the sensed temperature to account for at least the presence of the viewing window. One or more additional algorithms may also be applied, in addition to the first algorithm, to adjust the sensed temperature to account for variations in a material of the cookware, by determining if a significant variation from near ideal emissivity is present, using a change in temperature of the cookware as measured by the infrared temperature sensor.

Definition of Claim Terms

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Cookware" means cooking, serving or delivery containers for warming or heating food, including but not limited to dishes, pots and trays such as buffet trays, chafing dishes, warming trays, etc.

"Food" means any item or material which may be normally ingested by humans, including solid or liquid matter.

"Food container" means any container for warming food or for maintaining food in a warmed condition, such as but not limited to pizza delivery trays, food bags, etc.

"Inducible decal" means a label, film, or tag, such as a metallic label or tag which may be adhesively applied (or integrated into the surface), such as on the underside of non-metallic (such as porcelain or glass) cookware, which enables the cookware to be induction heated.

"Infrared temperature sensor" or "IR temperature sensor" means a device that can measure the temperature of a desired object by sensing its infrared emission levels.

"Viewing window" means a port that provides IR visibility of a heated object while inhibiting the intrusion of food or liquids into the induction heating unit.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

FIG. 1 is a perspective view of a induction heater countertop containing a viewing window;

FIG. 1A is a side perspective view of FIG. 1 at the viewing window;

FIG. 2 is a top perspective view of induction coils and an IR temperature sensor positioned within a gap located at the power ring of the coils;

FIG. 3 is a perspective view of the conical field of view of a prior art IR temperature sensor;

FIG. 4 is a perspective view of an IR temperature sensor which, according to a preferred embodiment of the invention, is covered by a narrowing-view tube; and FIG. 5 is a view along reference line 5-5 of FIG. 4 showing the narrowed conical field of view of an IR temperature sensor covered by the narrowing-view tube.

The components in the drawings are not necessarily to scale, emphasis instead being placed upon clearly illustrating the principles of the present invention.

DETAILED DESCRIPTION OF THE PREFERRED EMBODIMENT

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

As mentioned above, a number of problems were required to be solved before IR temperature sensing could be used for induction heating of food items, now discussed. Adequate spectral visibility of the object whose temperature is to be measured is required. In induction cooking, the appliance top must be sealed for health purposes. This is typically achieved with a glass top, typically ceramic glass, such as Schott Ceran glass-ceramic cooktop panels. The spectral response of this material is not acceptable as it blocks most of the radiant energy of interest, impeding an accurate measurement. Therefore, some sort of acceptable window must be formed or provided in the cooktop panel. Typical materials transparent to the desired wavelengths include silicon and germanium. These, however, are brittle and expensive, and thus not suited to the needs of commercial food service equipment. Reviewing material properties, it was determined that polyethylene plastic, naturally milky white, in thin sections, is adequately transparent. Accordingly, an induction unit 10 have a countertop 10a of a composite material, with an aperture 10b, into which is placed or embedded a thin polyethylene window 20, was devised for viewing the IR emissions emanating from a target object (see FIGS. 1 and 1A).

In an alternative embodiment, the induction countertop may be glass (e.g., tempered or CERAN glass) and may have a hole drilled into it, with the hole diameter corresponding to the size of the port of the viewing window. Beneath the glass, or laminated to it, a plastic backing sheet may be located which, in turn, may have a hole to accommodate a viewing window, relatively transparent to IR, such as a transparent or semi-transparent plastic (e.g., polyethylene). This plastic backing serves dual purposes: it supports a viewing window with adequate spectral response, while also ensuring that any fluids or other contaminants, as well as customer fingers, do not come into contact with electrical components within the induction unit in the event of glass breakage. Additionally, it may increase the tolerance of the glass to breakage.

Additionally, to achieve an accurate measurement of temperature, it is desirable to measure temperature at the location on the object to be measured where the greatest heat is. Measuring a maximum temperature enables monitoring of the ceramic to ensure its integrity (i.e., you do not want to crack the ceramic by heating it), while still allowing, in conjunction with time and power-controlled heating profiles, an inference as to what the temperature elsewhere on the object is, to enable the application of relatively uniform heating. (If a ceramic plate is being heated, the object whose temperature will be measured may be the bottom of the ceramic dish (which may include an inducible decal), whereas if a metallic plate is being heated, the object whose temperature will be measured will likely be the bottom of the metallic plate.) The easiest place to measure is through the center of the induction coil, as there is already a hole here. This, however, is not the warmest area; in fact, the induction field and heating are relatively low there. Induction coils produce an area of greatest heating typically known as the "power ring." It would be desirable to make IR measurements near the center of the power ring. To accomplish this, and referring now to FIG. 2, a special induction coil 30 is provided which is created using a winding technique in which a gap 31 is left to accommodate the mounting of IR sensor 33. Gap 31 is preferably located in a radius of the power ring of the induction coil.

Yet another problem that had to be overcome was that presented by the variation in commercially available food holding pans. Pans can vary greatly in materials. The most common choices for use with induction cooking are stainless steel, cast iron and specially-prepared ceramics (which must include an inducible decal). Most commercially available IR sensors are calibrated to measure the temperatures of objects that have an emissivity of close to 1. Even when developing a new IR temperature measurement device, an emissivity number/value must be assumed, and will be constant. This is an issue in the induction cooking environment, as emissivity values fluctuate depending upon the pan material used.

Accordingly, it became necessary to develop algorithms intended for use with applications in food warming and holding, as explained below, in order to compensate not only for the temperature of the polyethylene window, but also to properly adjust the sensed temperature depending upon the pan material used, in order to achieve accurate temperature measurement of the target vessel.

Preferably, an algorithm may be used to take measurements of a pan/cooking vessel to determine if a significant variation from near ideal emissivity is present. The algorithm may use the change in temperature of the object, as measured by the IR sensor. By applying a constant amount of energy, a typical $\Delta T$ may be expected for a given pan. The type of pan can be roughly classified by the same nominal amount of power the pan draws. This classification aids in determining the expected $\Delta T$. If the expected $\Delta T$ is not measured, the ratio of the expected and measured temperatures may be used to adjust the effect of emissivity on the temperature measurement. Further, through extensive testing, it was determined that this relationship varied as a function of temperature. To account for this variation, a piecewise function may be empirically determined and applied to the corrected temperatures to increase accuracy (e.g., for a certain temperature range, one power level may be applied, whereas for a subsequent temperature range, a different power level may be applied). "Piecewise" rather than continuous heating may be used to simplify the process.

In order to protect the IR sensor from the cooking environment, the IR sensor must be sealed and protected from damage and from contaminants present in the cooking environment. Further, to meet food equipment health standards, the induction unit top must be sealed from the intrusion of food or liquids. To accomplish this, the sensor must be located inside the induction unit enclosure, yet with a path that provides for the transmission of the required wavelengths in order to obtain an accurate temperate measurement. Typical materials used in induction equipment top surfaces—CERAN glass/ceramic composite and tempered glass—do not pass these wavelengths. If a sensor is placed behind either of these materials, the sensor will only monitor the temperature of the glass/CERAN. Any accuracy achieved using this method is only possible when the glass/CERAN and pan have achieved thermal equilibrium. Therefore, an opening may be placed in the top enclosure material to allow the IR sensor to view the pan. To protect and seal this opening, a "window" of another material may be inserted, per FIGS. 1 and 1A. The optical properties of the material preferably allow for the transmission of the IR wavelengths, approximately 2-15 µm. Many materials exist with such properties, but most of these materials cannot handle the harsh cooking environment or are too costly to be used in a commercially viable product. It was found that polyethylene plastic is a material that meets the optical and cost requirements. However, it has its own emissivity and thermal mass, so it is preferably accounted for in the temperature measurement using appropriate algorithms.

It is fairly well known that the presence of a "window" or other material with translucency in the IR band can be accounted for if the temperature of the window is exactly that of the IR measurement device or of the object being measured. However, in this application, neither of those options is practical, as the window temperature will be somewhere between the pan or object temperature on the one hand, and the sensor's temperature on the other. It was found that a method similar to that described above may be implemented to solve this challenge. The temperature of the window can be estimated based on the object temperature, the sensor temperature and the amount of time the object has been present using the basic laws of radiation and conduction in thermodynamics. Deriving the window temperature allows the decomposition of the aggregate temperature measurement (including the window and object temperature) to obtain an accurate object-only temperature. The algorithm was derived empirically to aid in the simplicity of application. The actual correction factor/formula used was $T_o=1.3T_i-T_{window}$, where $T_i$ is the measured temperature that the sensor delivers before it is corrected, and $T_{window}$ is the temperature of the narrowing tube.

Compensation must also be made for the IR sensor field of view. Typically, available IR temperature measurement devices have a cone-shaped field of view such as shown in FIG. 3. The IR sensor will measure an aggregate or average temperature of the entire field of view. Given the physical constraints required to locate a temperature sensor in a practical induction appliance, this is unacceptable. To reduce this field of view, and referring now to FIGS. 3-5, it was experimentally determined that a tube or cylinder 50 may be added to cover the IR sensor 33. Tube 50 may be made of aluminum, to provide even heat distribution, and its inner surface may be painted black to allow for ideal emissivity (close to 1) and radiation. The reduced field of view is shown in FIG. 5, in which angle α in FIG. 5 is substantially less than angle θ from FIG. 3. Exemplary angle Θ ranges for a typical sensor are in the 60 degree range (60° to either side of the centerline), while exemplary angle α ranges may be 10° to either side of the centerline. The angle α can be controlled by varying the length of the tube and its diameter. The net effect is that the IR sensor's aggregate temperature measurement includes the temperature of the tube and the average temperature of the object to be measured, in a narrower field of view. The temperature of the tube can be controlled by fitting it into contact with the sensor, so that it may be assumed to be the same temperature as the sensor. With the temperature of the tube known, and the measured sensor temperature known, the object temperature can be calculated using the ratio of the original field of view area that is now represented by the tube and the area remaining of the object, and the ratio of tube temperature to the $4^{th}$ power and unknown object temperature to the $4^{th}$ power. This results in the average temperature of the object, as follows:

$$T_{obj} = ((T_{measured}^4) + (A/a1)(T_{measured}^4 - T_{At}^4))^{(-1/4)} - 2.433 T_{At}$$

where: $T_{obj}$ is the desired temperature of the object; $T_{measured}$ is the sensor reading; A is the area of the tube seen by the sensor; a1 is the area of the target seen by the sensor; and $T_{At}$ is the temperature of the tube. In this implementation, A/a1=170.

By applying all three of these adjustments (for the window, the pan material, and the adjusted field of view), a practical IR temperature measurement system may be constructed for use with induction appliances. Such a system will have all of the accuracies and advantages achieved by measuring the pan/object temperature directly, and is believed to be superior to other methods currently in use.

Those of ordinary skill in the art will not perceive that the improved IR sensor temperature measurement system and method of the present invention provides a more accurate way to obtain and control a pan temperature. Additionally, it allows the use of specially-prepared induction ceramic plates, bowls, etc. to be used. The thermal gradient across a ceramic plate is significant and, if not carefully controlled, can cause the dish to break. Due to the ceramic manufacturing process, the ceramic plate or dish typically sits on ridges, adjacent a recessed area, making temperature sensing employing direct contact methods difficult and prone to inaccuracy, as the portions of the ceramic plate which are measured by direct contact methods may be at variable distances given these ridges and recesses. For this reason, given its enhanced accuracy, an IR temperature sensing method may be required in order to safely and reliably heat these types of vessels. To use an IR temperature sensing method, ceramic plates, for example, may be equipped with a ferrous or electrically conducting decal permanently applied to the plate. (A silver decal may be applied to a recessed area on the bottom of the ceramic plate, for example.) This decal is inducible and transmits its energy to the ceramic. The IR method provides the responsiveness and accuracy needed to successfully heat these plates.

The above description is not intended to limit the meaning of the words used in the following claims that define the invention. Persons of ordinary skill in the art will understand that a variety of other designs still falling within the scope of the following claims may be envisioned and used. It is contemplated that future modifications in structure, function, or result will exist that are not substantial changes and that all such insubstantial changes in what is claimed are intended to be covered by the claims.

What is claimed is:

1. A system for measuring the temperature of cookware to be induction-heated, comprising:
   an induction heater having a countertop for supporting the cookware;
   an infrared temperature sensor at least partially covered with a metal tube to narrow the field of view of the sensor;
   a controller, an electronic storage medium, and an induction heating coil in responsive communication with the controller;
   the countertop comprising a first material and having a viewing window comprising a second material located between the infrared temperature sensor and the cookware, wherein the viewing window prevents fluids or other physical contaminants from contacting the induction heater while providing visibility to infrared waves;
   wherein a temperature of the cookware is sensed using the infrared temperature sensor, and the controller applies an algorithm stored in the electronic storage medium and utilizing a measured temperature of the metal tube, to adjust the sensed temperature to account for the narrowed field of view of the infrared temperature sensor, thereby providing a more accurate temperature of a portion of the heated cookware within the narrowed field of view.

2. The system of claim 1, wherein the second material has an acceptable spectral response such that the viewing window does not substantially block radiant energy emanating from the cookware.

3. The system of claim 2, wherein the viewing window allows a transmission of IR wavelengths from the cookware in the range of approximately 2-15 um.

4. The system of claim 1, wherein the second material comprises a transparent or semi-transparent plastic.

5. The system of claim 1, wherein the second material comprises plastic or silicon or germanium.

6. The system of claim 1, wherein the first material comprises tempered or CERAN glass and includes a first aperture having the approximate dimensions of the viewing window.

7. The system of claim 6, wherein the glass is backed by a plastic backing sheet including a second aperture, and a polyethylene sheet forming the viewing window is located within the second aperture.

8. The system of claim 6, wherein the cookware comprises porcelain.

9. The system of claim 1, wherein the induction heater includes an induction coil with a gap, and wherein the infrared temperature sensor is located at the gap.

10. The system of claim 9, wherein the gap in the induction coil is located at a radius of the power ring of the induction coil.

11. A system for measuring the temperature of cookware to be induction-heated, comprising:
    an induction heater for heating the cookware;
    an infrared temperature sensor for measuring a temperature of the cookware;
    a controller and an electronic storage medium;
    a device for narrowing the field of view of the temperature sensed by the infrared temperature sensor;
    wherein a temperature of the cookware is sensed using the infrared temperature sensor, and the controller applies an algorithm to adjust the sensed temperature to account for the narrowed field of view.

12. The system of claim 11, wherein the device for narrowing the field of view of the infrared temperature sensor comprises a metal cylinder.

13. The system of claim 12, wherein the cylinder comprises aluminum.

14. The system of claim 12, wherein the inner surface of the cylinder is black in color.

15. The system of claim 11, wherein the field-of-view algorithm involves a ratio of the surface area of the narrowing field-of-view device area and the surface area of the cookware which is visible to the infrared temperature sensor.

16. The system of claim 11, wherein the field-of-view algorithm involves a measured temperature of the narrowing field-of-view device raised to the fourth power to derive an average temperature of the cookware.

17. The system of claim 11, wherein the induction heater includes a countertop for supporting the cookware, and the countertop includes a viewing window located between the infrared temperature sensor and the cookware.

18. The system of claim 17, wherein a second algorithm is applied to adjust the sensed temperature to account for the presence of the viewing window.

19. A system for measuring the temperature of cookware to be induction-heated, comprising:
  an induction heater for heating the cookware;
  a controller and an electronic storage medium;
  an infrared temperature sensor for measuring a temperature of the cookware; wherein a temperature of the food item is sensed using the infrared temperature sensor, and the controller applies one or more algorithms to adjust the sensed temperature to account for variations in a material of the cookware, wherein the one or more algorithms determine if a significant variation from near ideal emissivity is present, using a change in temperature of the cookware as measured by the infrared temperature sensor.

20. The system of claim 19, wherein the one or more algorithms are derived using a piecewise function empirically determined and applied to the corrected temperatures.

* * * * *